United States Patent [19]

Takada

[11] Patent Number: 5,018,026

[45] Date of Patent: May 21, 1991

[54] HAND-HELD COPYING APPARATUS

[75] Inventor: Yuji Takada, Nara, Japan

[73] Assignee: Sharp Kabushiki Kaisha, Osaka, Japan

[21] Appl. No.: 533,355

[22] Filed: Jun. 5, 1990

Related U.S. Application Data

[62] Division of Ser. No. 340,770, Apr. 20, 1989, Pat. No. 4,931,880.

[30] Foreign Application Priority Data

Apr. 25, 1988 [JP] Japan .................................. 63-101949

[51] Int. Cl.$^5$ .............................................. H04N 1/40
[52] U.S. Cl. .................................... 358/473; 358/453; 392/9
[58] Field of Search ....................... 358/448, 453, 473; 392/9

[56] References Cited

U.S. PATENT DOCUMENTS 4,523,235  6/1985  Rajchman ........................... 358/473
4,558,374  12/1985  Kurata et al. ....................... 353/453
4,805,135  2/1989  Ochi et al. .......................... 353/453

Primary Examiner—Edward L. Coles, Sr.

[57] ABSTRACT

A copying apparatus for portable type having an image reader for reading an image of a document, a memory for storing image data obtained by the image reader, a printer for printing out the image of the document read out by the image reader according to the image data stored in the memory and a processor for controlling the image reader and the printer wherein upper and lower blank lines are searched for with respect to each of partial images divided from the whole image stored in the memory. Image data, except for the image data existing in an area defined between the upper and lower blank lines which have been found by respective blank line search, are erased upon printing.

10 Claims, 8 Drawing Sheets

HAND-HELD COPYING APPARATUS

This application is a divisional of copending application Ser. No. 340,770, filed on Apr. 20, 1989, now U.S. Pat. No. 4,931,880.

BACKGROUND OF THE INVENTION

1. Field of the Invention

The present invention relates to a copying apparatus of portable type which is able to print out one or more lines by picking up or extracting the lines from a text that has been read by the portable copying apparatus.

2. Description of the Prior Art

In the Japanese patent laid open publication (JP-A) No. 102466/1988, there is disclosed a copying apparatus of portable type capable of printing one or more lines extracted from lines which have been read by an image reader.

FIGS. 13 to 16 show the manner of printing of this copying apparatus.

When an area p of a document is read by scanning the copying apparatus in a direction P manually as shown in FIG. 13, a document image p as shown in FIG. 14 is obtained. When the document image p is obtained, a blank line having no data to be printed therealong is searched for downwardly from the upper edge UE of the document image p.

When the first blank line is found, as indicated by "a" in FIG. 14, an image portion existing above the first blank line a is erased. Thereafter, the search for the blank line is done upwardly from the lower edge LE of the document image p. An image portion existing below the first blank line b found is also erased. Thus, only the central line image is printed out as shown in FIG. 16.

In another method for erasing unnecessary images, as shown in FIG. 15, a blank line is searched for from the center image line CL of the document image upwardly and an image portion existing above the first blank line u is erased. Similarly, an image portion existing below the first blank line d found by the downward search is erased. According to this method, only the central image line is printed out as shown in FIG. 16.

However, it is not easy to manually move the copying apparatus parallel to image lines of a document. If the copying apparatus is moved in a meandering direction as indicated by a line Q in FIG. 17, such a document image q as shown in FIG. 18 is obtained inconveniently. In this case, it becomes impossible to search for blank lines since they are meandering in the read document image q. Thus, it is impossible to print out only the central image line by the conventional portable copying apparatus.

SUMMARY OF THE INVENTION

An essential object of the present invention is to provide a copying apparatus of portable type capable of printing only one or more central image lines of a document image having been read even if the copying apparatus is moved in a meandering manner.

In order to achieve the object of the present invention, there is provided a copying apparatus comprising: an image reading means for reading an image of a portion of a document and generating dot images corresponding to the image having been read; a memory means for storing dot images obtained by said image reading means; an image division means for dividing the stored image into partial images in a direction of print; an image extraction means for extracting only a central portion to be printed out with respect to each of said divided partial images by detecting a pair of blank lines between which said central portion is defined; and a print means for printing out said central portions of said divided partial images.

According to the present invention, the area of the image having been read by the image reading means and stored in the memory means is divided into plural image areas and in every partial image area, a central image portion is found by the image extraction means. The print means prints out only central image portions having been extracted by the image extraction means.

When the copying apparatus is moved in a meandering manner, it becomes impossible or difficult to find blank lines in a whole document image having been read. However, since the whole document image is divided into partial images according to the present invention, blank lines can be easily found in every partial image. Thus, the central portion of the document image is surely reproduced even if the copying apparatus is moved in a meandering manner.

It is to be noted that the present invention is also effective for copying a document having meandering image lines as shown in FIG. 18, since the central meandering line or lines can be surely extracted according to the present invention.

BRIEF DESCRIPTION OF DRAWINGS

These and other objects and features of the present invention will become more apparent when a preferred embodiment of the present invention is described in detail with reference to the accompanying drawings which are given by way of illustration only, and thus are not limitative of the present invention, and wherein.

DETAILED DESCRIPTION OF THE PREFERRED EMBODIMENT

Figure 1:
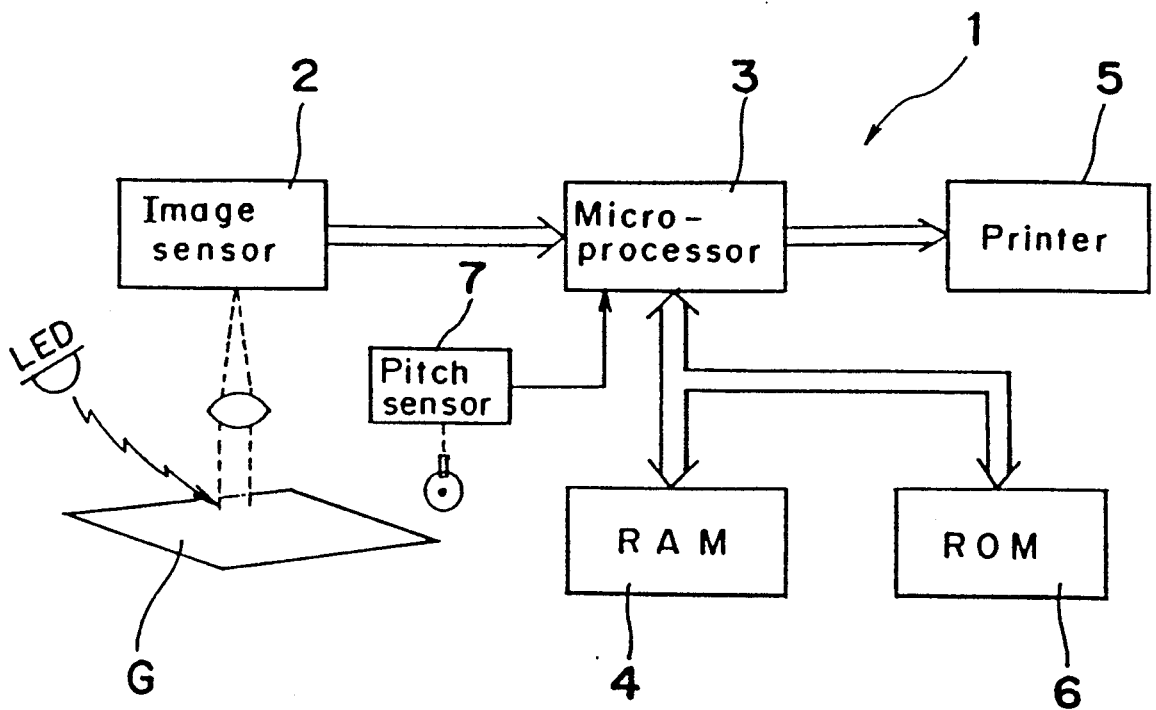
FIG. 1 is a block diagram of a portable copying apparatus according to a preferred embodiment of the present invention.
Figure 2:
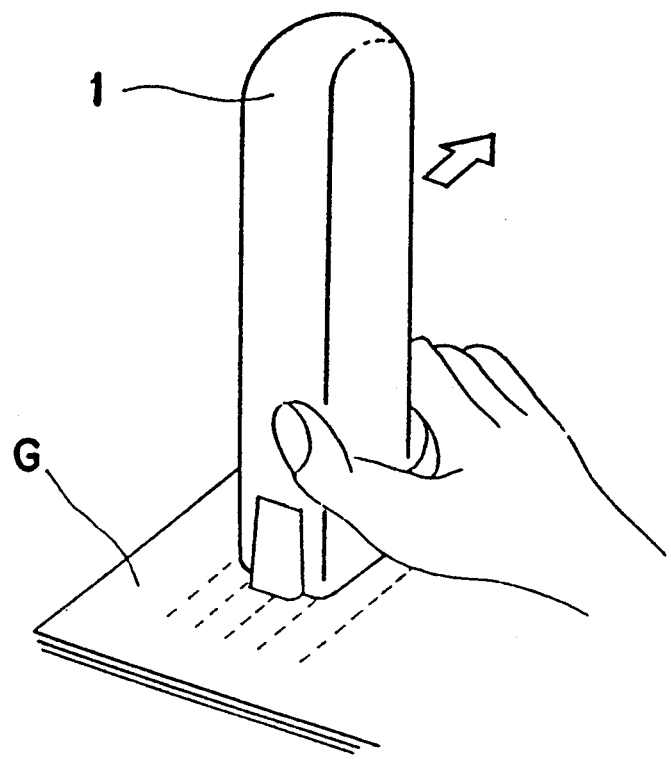
FIG. 2 is a perspective view of the portable copying apparatus.

FIG. 1 shows a block diagram of a portable copying apparatus according to a preferred embodiment of the present invention and FIG. 2 shows a perspective view of the portable copying apparatus.

As shown in FIG. 1 schematically, the portable copying apparatus 1 is comprised of an image sensor 2 for partially reading an image of a document G to obtain electrical dot image data corresponding thereto, a microprocessor 3 for controlling the copying apparatus as a whole, a RAM (Random Access Memory) means 4 for storing the image data obtained by the image sensor 2, a printer means 5 for printing out an image of a document in accordance with image data processed by and sent from the microprocessor 3, a ROM (Read Only Memory) means 6 for storing programs to be executed by the microprocessor 3 and a pitch sensor 7 for generating timing signals upon reading a document or printing an image of the document.

As shown in FIG. 2, the copying apparatus 1 is operated manually on a document G in order to read an image of the document G.

The microprocessor 3 controls all of means 2, 4, 5 and 6 of the copying apparatus 1 according to programs stored in the ROM 6. Among these programs, only programs related to the subject matter of the present invention will be explained hereinafter referring to flow charts shown in FIGS. 3 and 4, respectively.

Figure 3:
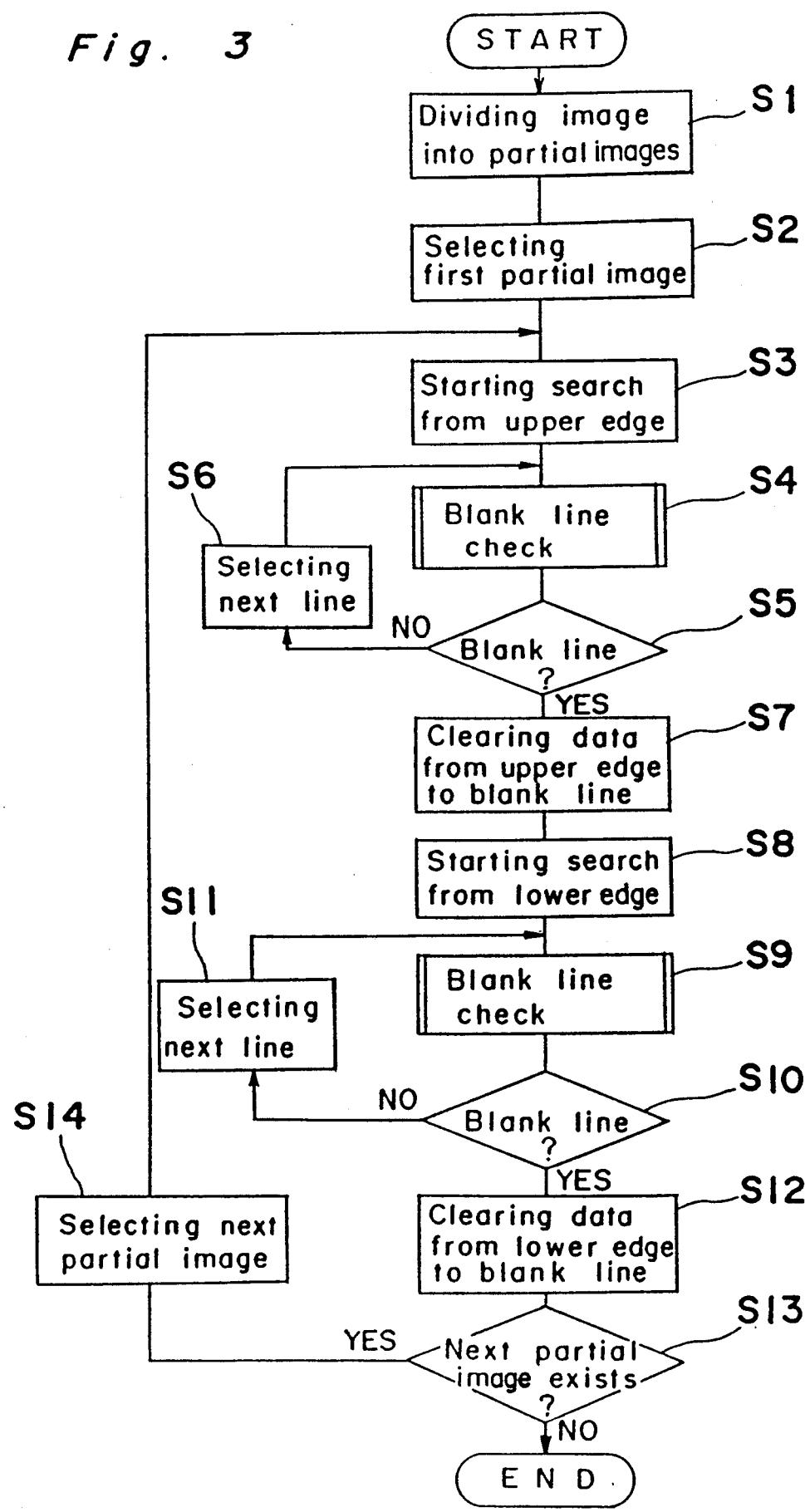
FIG. 3 is a flow chart of the processing for extracting a central portion of a document image read out.

FIG. 3 is a flow chart of a program for extracting a central portion of a document image read by the image sensor 2.

When this program is started, the document image read by manually scanning the copying apparatus 1 is divided into partial images at step S1.

Figure 5:
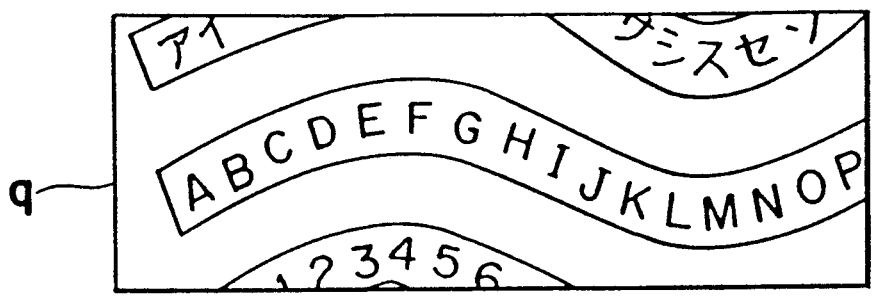
FIG. 5 is an example of a document image read when the copying apparatus is moved in a meandering manner.
Figure 6:
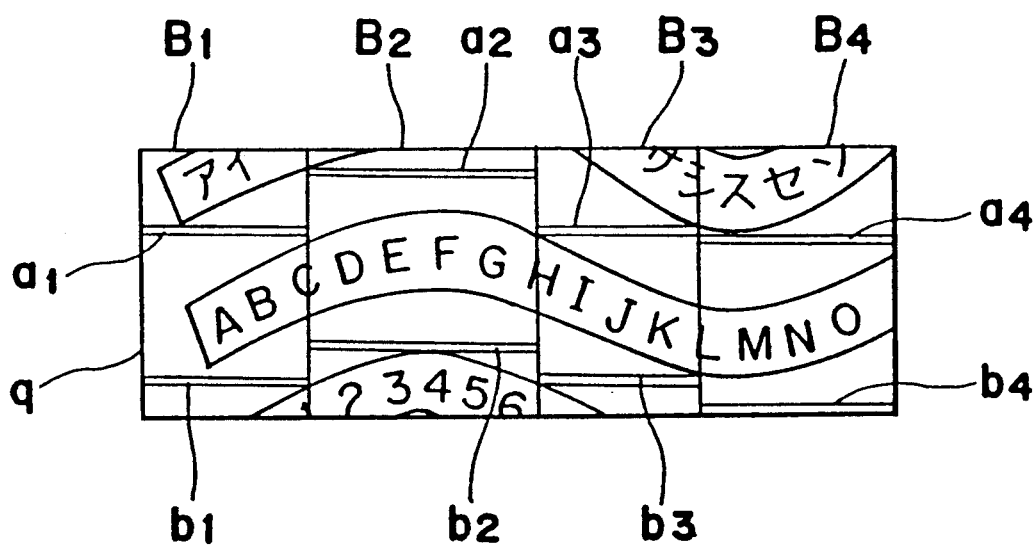
FIG. 6 is an example of a method for dividing the document image shown in FIG. 5 and for searching for blank lines.

FIG. 5 shows an example of a document image q read by moving the copying apparatus on the document G in a meandering manner and FIG. 6 shows a method for dividing the document image into partial images. In this example, the whole area of the document image q is divided into four areas $B_1$ to $B_4$ in the lengthwise direction thereof. The width of each of the four areas $B_1$ to $B_4$ are not necessarily equal to each other. Also, the number of division is not limited to four.

Figure 4:
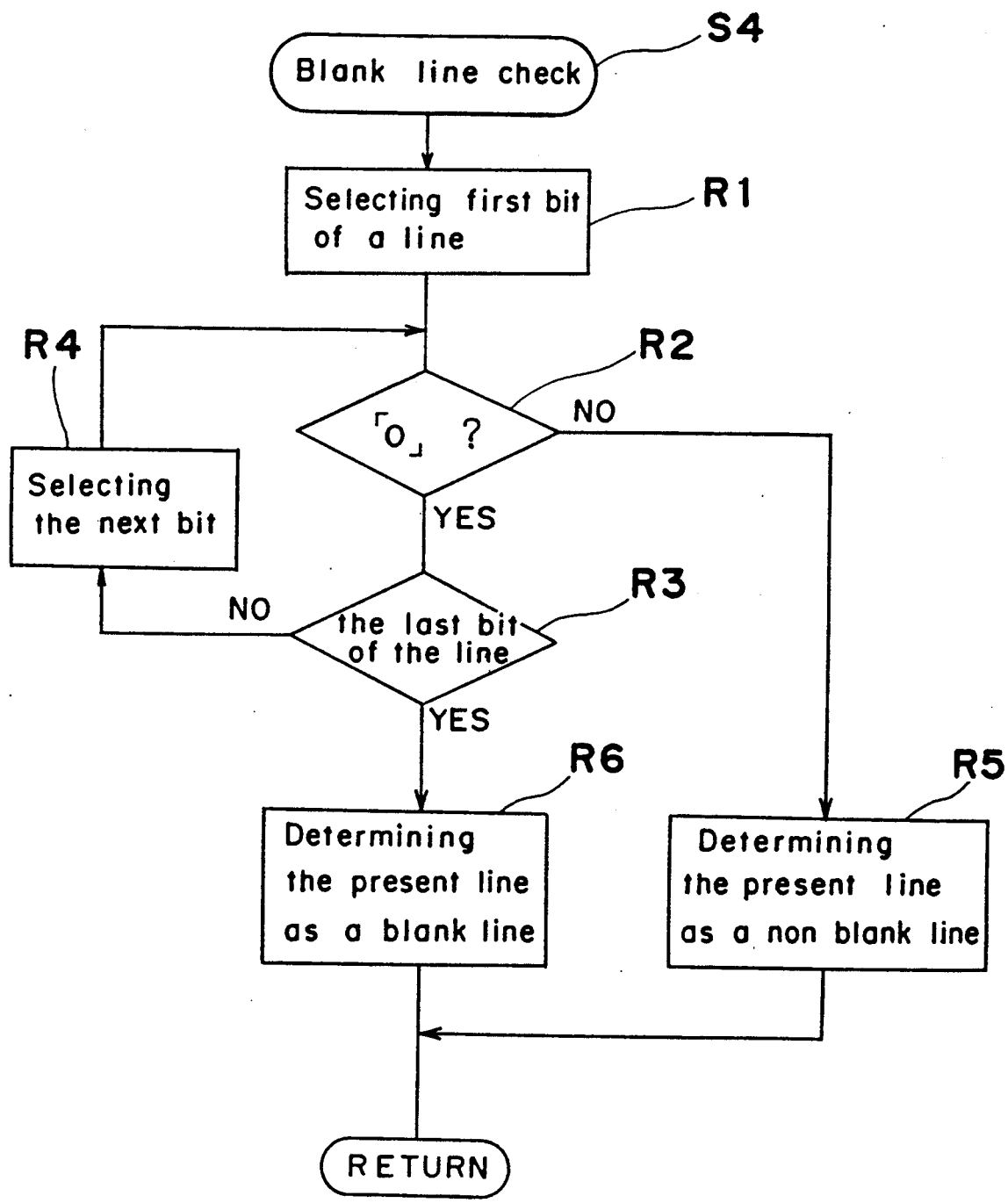
FIG. 4 is a flow chart of the subroutine for checking blank lines shown in FIG. 3.

Next, the first divided area $B_1$ of the document image q is selected, which is the first area seen in the direction of print, at step S2. Then a downward search for finding a blank line is started from the upper edge of the first area $B_1$ at step S3 in order to check or search for a blank line which might be included therein at step S4. The flow chart of the subroutine S4 is shown in FIG. 4.

In this subroutine S4, it is checked whether or not a presently designated line is a blank line.

Namely, the first bit of the designated line is selected at step R1 and it is checked at step R2 whether or not the first bit is zero. If it is zero, the next bit is selected at step R4 in order to check whether or not it is zero at step R2. Thus, this check loop is repeated sequentially until a bit equal to one is found. If no bit equal to one is found from the first bit to the last bit of the present line (at step R3), the present line is determined as a blank line at step R6. If a bit equal to one is found at step R2, the process advances to step R5 and the present line is determined not to be a blank line.

Returning to the flow chart of FIG. 3, when the blank line check of one line is completed at step S4, it is checked whether or not the checked line is a blank line at step S5. If it is not a blank line, the process returns to step S4 after selecting the next line at step S6.

If the line is decided to be a blank line at step S5, the process advances to step S8 and all image data existing between the upper edge and the blank line (See $a_1$ of FIG. 6) in the first area $B_1$ is cleared (erased) at step of S7.

Next, the blank line check is started from the lower edge upwardly at step S8 and is executed by repeating steps from step S9 to step S11 in a similar manner to than of step S4 to step S6.

When a blank line is found at step S10, all image data existing between the blank line (See $b_1$ of FIG. 6) and the lower edge in the first area $B_1$ is cleared or erased.

Then, the second partial image is selected at step S14 and the process returns to step S3 in order to find the upper and lower blank lines $a_2$ and $b_2$ (See FIG. 6) in the second area $B_2$ and to delete image data existing above the upper blank line $a_2$ and below the lower blank line $b_2$.

The processing similar to the above is repeated with respect to the third and fourth partial image areas $B_3$ and $B_4$.

Figure 7:
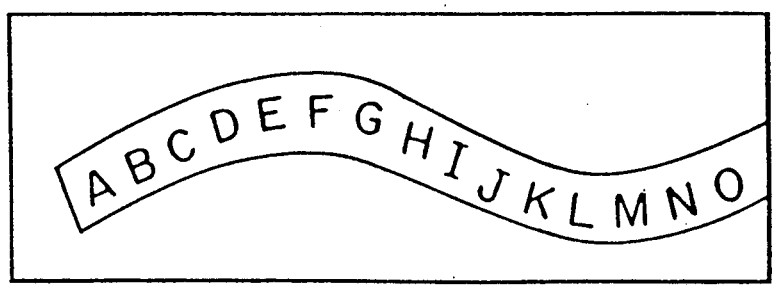
FIG. 7 is an example of a copy obtained by the preferred embodiment of the present invention.

When the processing regarding the fourth partial image area $B_4$ is completed, all unnecessary image data is deleted or erased and only central image data remains in the RAM 4, as shown in FIG. 7.

Accordingly, the printer 5 prints out only the central image according to the image data remaining in the RAM 4.

Figure 8:
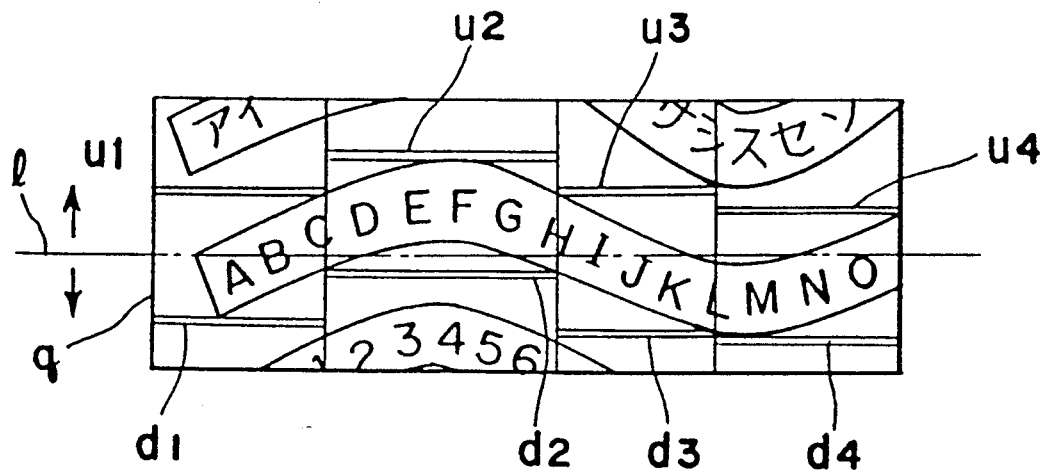
FIG. 8 is another example of the method for searching blank lines.

As shown in FIG. 8, the blank line check can be executed starting from a center line l of the document image q upwardly and downwardly. In this case, it is also possible to extract only necessary image data by searching upper blank lines $u_1$ to $u_4$ and lower blank lines $d_1$ to $d_4$ as shown in FIG. 8.

Figure 9:
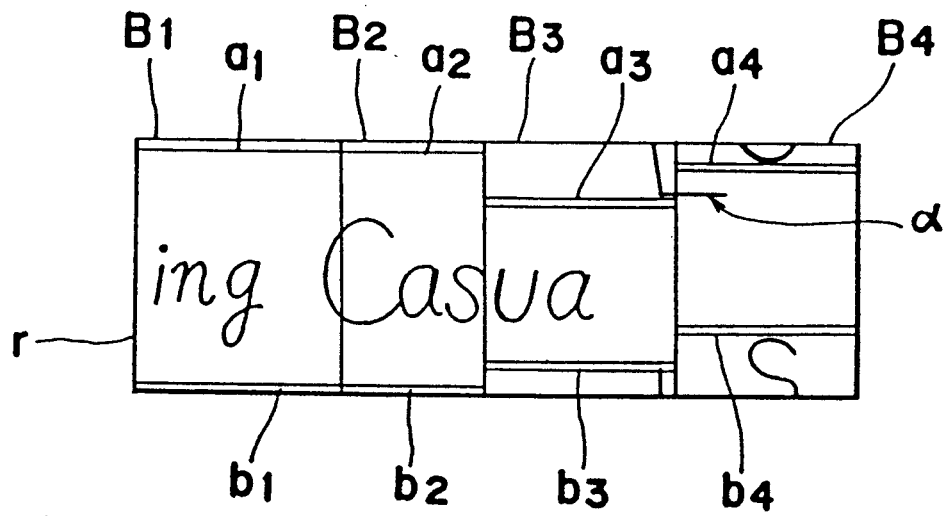
FIG. 9 is an example of a document image divided into partial images without any overlap between two adjacent partial images.

Assuming an extraordinary case wherein character images are read in a discrete manner as shown in FIG. 9, a fraction of a character as indicated by α therein cannot be erased even by the erasing method as explained above referring to FIG. 6.

Figure 10:
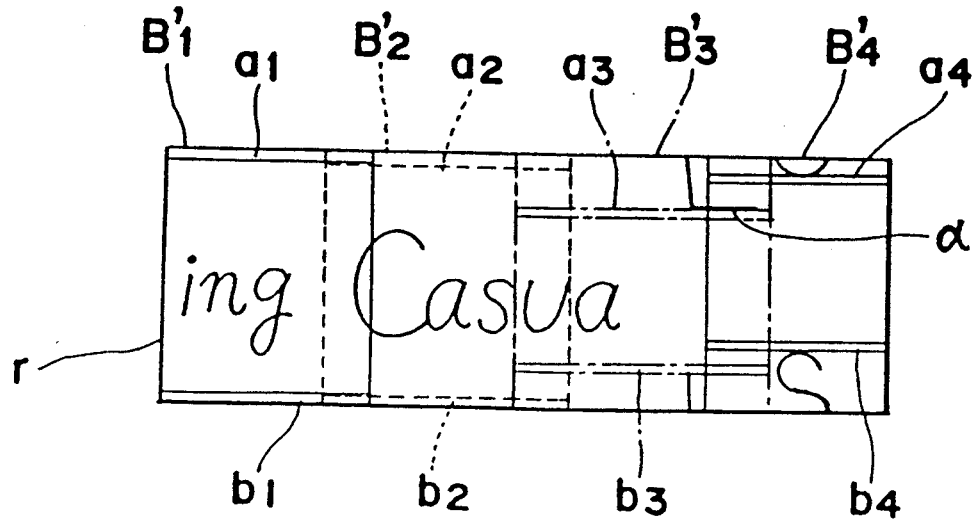
FIG. 10 is another example of the division into partial images which are overlapped between two adjacent partial images.

In order to solve this problem, it is desirable to divide the whole document image r into four areas from $B_1'$ to $B_4'$, each of which is partially overlapped with an adjacent area, as shown in FIG. 10. The fraction indicated by α is erased when the blank line check for the third area $B_3'$ is executed, as is easily understood from FIG. 10.

Figure 11:
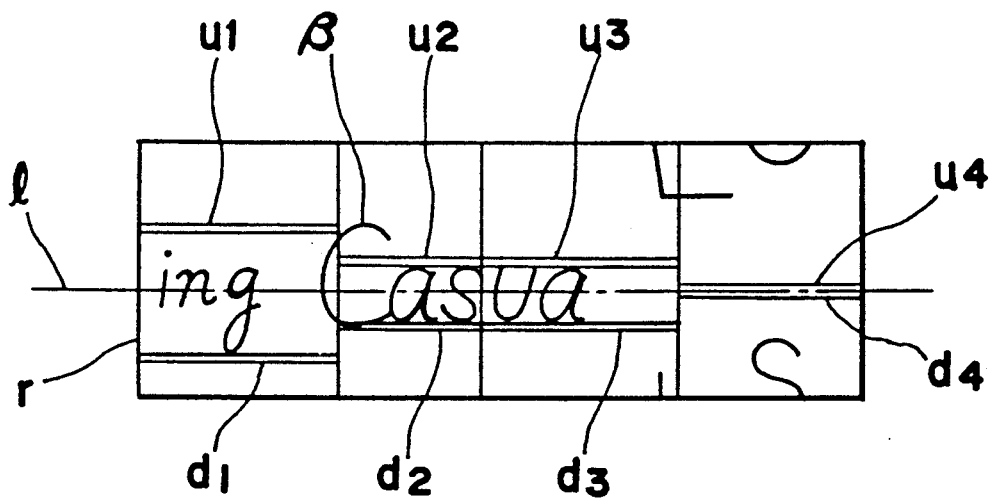
FIG. 11 is another example of the method for searching for blank lines corresponding to the example shown in FIG. 9.
Figure 12:
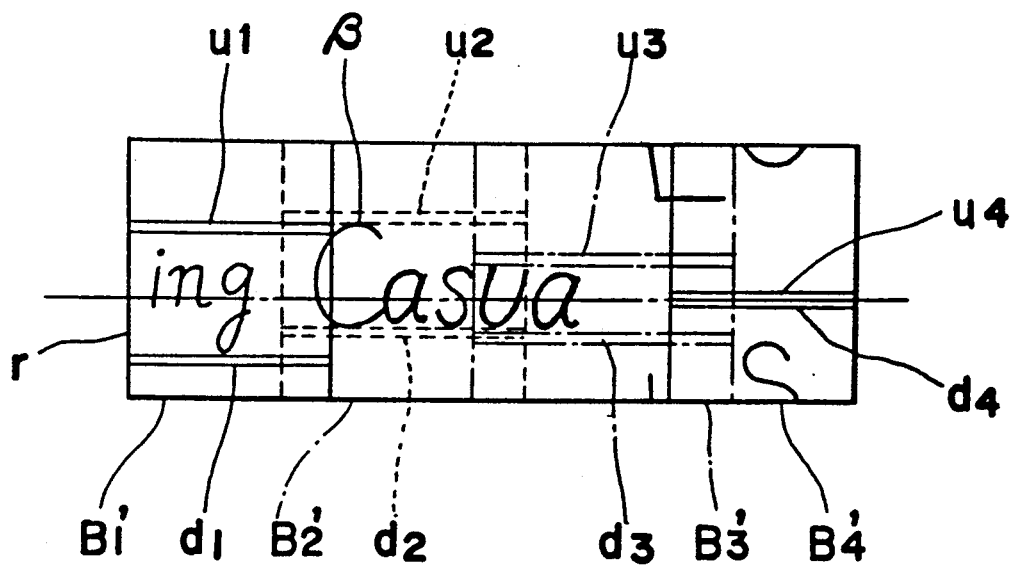
FIG. 12 us another example of the method for searching for blank lines corresponding to the example shown in FIG. 10.
Figure 13:
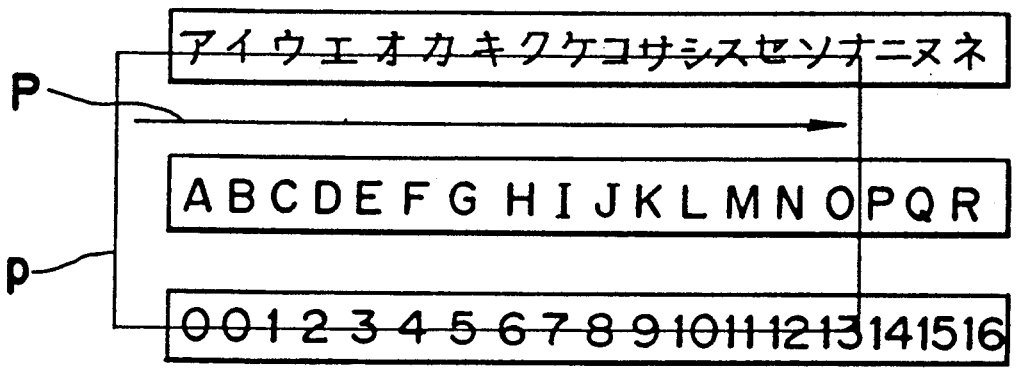
FIG. 13 is an example of a document image to be read by a portable copying apparatus.
Figure 14:
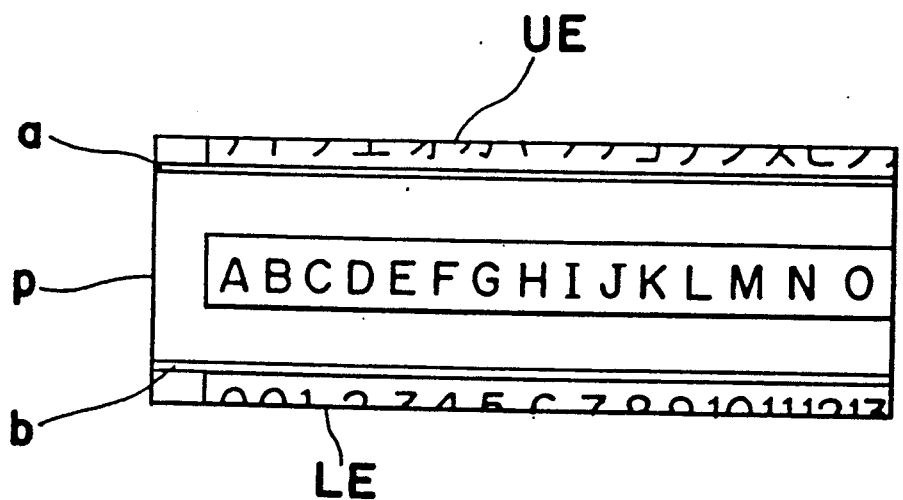
FIG. 14 is an explanatory view for showing a conventional method for picking up a central portion of the document image having been read.
Figure 15:
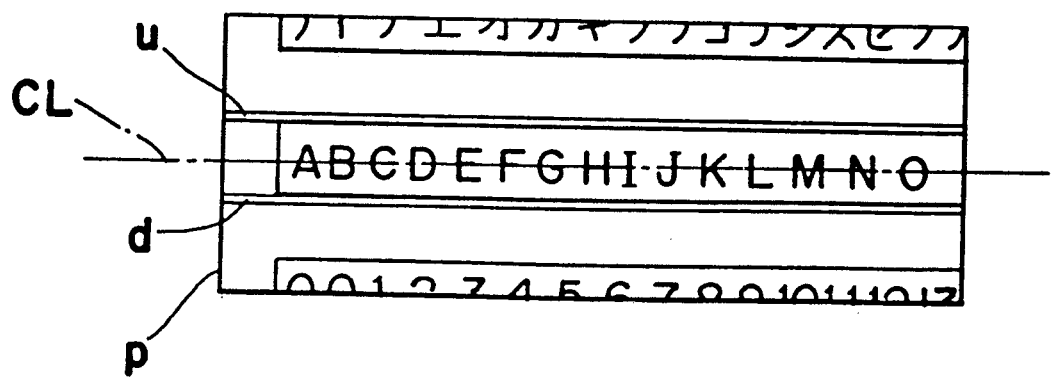
FIG. 15 is an explanatory view for showing another conventional method for extracting a central portion of the document image having, been read.
Figure 16:
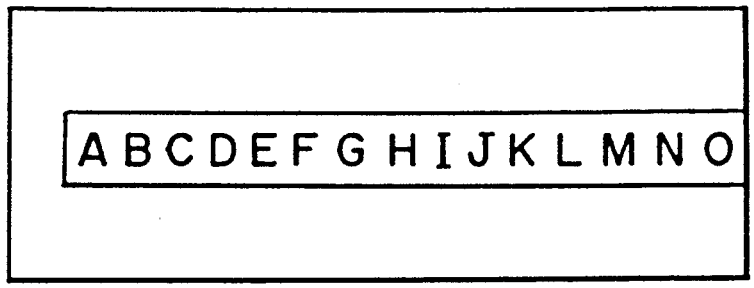
FIG. 16 is an example of a copy obtained according to the conventional method as shown in FIGS. 14 or 15.
Figure 17:
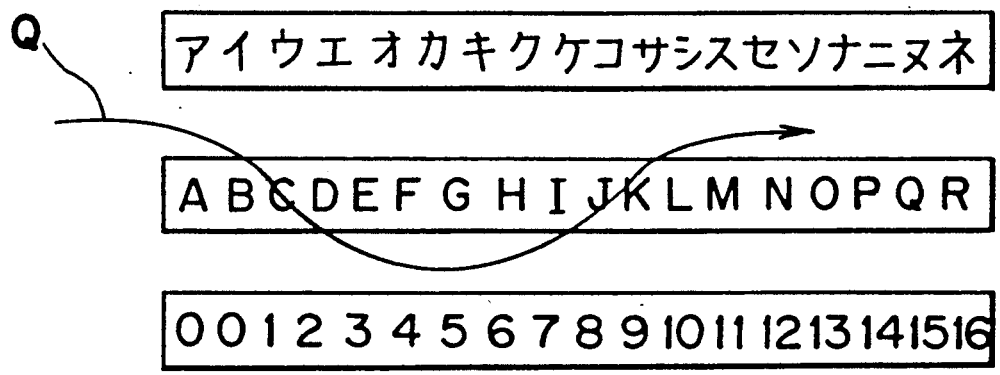
FIG. 17 is an explanatory view for showing a manner of operation of the copying apparatus.
Figure 18:
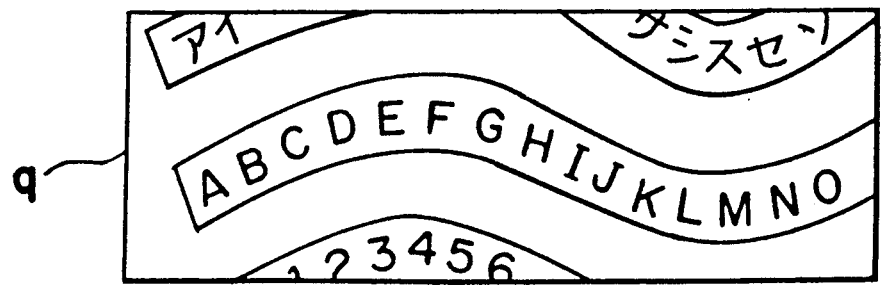
FIG. 18 is an example of a copy obtained according to the conventional method when the copying apparatus is moved in the meandering manner as shown in FIG. 17.

Contrary to the above, in the case that the method for blank line check as explained in FIG. 8 is employed, a fraction β of a capital letter "C" is erased inconveniently as shown in FIG. 11. However, this problem is also solved by dividing the whole image area r into four areas B₁' to B₄' partially overlapped with each other, as is easily understood from FIG. 12.

Accordingly, it is desirable to set respective areas so as to partially overlap with each other upon dividing the whole document image.

The preferred embodiments described herein are illustrative and not limitative, the scope of the invention being indicated by the appended claims and all variations which come within the meanings of the claims are intended to be embraced herein.

What is claimed is:

1. A method of copying an image from a written document comprising the steps of:
    reading the image of a portion of the written document, with an image reading means, and generating dot images corresponding to said image having been read;
    storing in a memory means, dot images obtained by said image reading means;
    dividing said stored dot images into partial images in a direction of print;
    extracting only a central portion of said divided partial images by detecting a pair of blank lines between which said central portion is defined; and
    printing out said central portions of said divided partial images.

2. The method of copying an image as claimed in claim 1, wherein each of said partial images is divided so as to partially overlap with an adjacent partial image in the print direction.

3. The method of copying an image as claimed in claim 1 wherein said image has an upper edge and a lower edge and a plurality of lines located sequentially therebetween, said detecting of said pair of blank lines comprising detecting as an upper blank line a first blank line of said plurality of lines located sequentially downward from said upper edge of said image and detecting as a lower blank line a first blank line of said plurality of lines located sequentially upward from said lower edge of said image.

4. The method of copying an image as claimed in claim 1 wherein said image has an upper edge and a lower edge, a plurality of lines located sequentially therebetween, and a center line, said detecting of said pair of blank lines comprising detecting as an upper blank line a first blank line of said plurality of lines located sequentially upward from said center line and detecting as a lower blank line a first blank line of said puerility of lines locate sequentially downward from said center line.

5. The method of copying an image as claimed in claim 2 wherein each of said overlapping adjacent partial images respectively has an upper edge and a lower edge and a plurality of lines located sequentially therebetween, said extracting comprising detecting a corresponding pair of blank lines for each of said overlapping adjacent partial images comprising detecting as an upper blank line a first blank line of said plurality of lines located sequentially downward from the corresponding upper edge of a respectively overlapping adjacent partial image and detecting as a lower blank line a first blank line of said plurality of lines located sequentially upward from the corresponding lower edge of the respective overlapping adjacent partial image.

6. The method of copying an image as claimed in claim 2 wherein each of said overlapping adjacent partial images respectively has an upper edge and a lower edge, a plurality of lines located sequentially therebetween, and a center line, said extracting comprising detecting a corresponding pair of blank lines for each of said overlapping adjacent partial images comprising detecting as an upper blank line a first blank line of said plurality of lines located sequentially upward from the corresponding center line of a respective overlapping adjacent partial image and detecting as a lower blank line a first blank line of said plurality of lines located sequentially downward from the corresponding center line of said respective overlapping adjacent partial image.

7. A copying apparatus comprising:
    image reading means for reading an image of a portion of a document and generating dot images corresponding to said image having been read;
    memory means for storing dot images obtained by said image reading means;
    image division means for dividing said stored dot images into overlapping partial images so as to partially overlap with an adjacent partial image in a direction of print;
    image extraction means for extracting only a central portion to be printed out with respect to each of said divided overlapping partial images by detecting a respective pair of blank lines between which said central portion is defined; and
    print means for printing out said central portions of said divided overlapping partial images,
    each of said divided overlapping partial images has an upper edge and a lower edge and a plurality of lines located sequentially therebetween, each of said detected respective pairs of blank lines comprising an upper blank line and a lower blank line, said upper blank line a first blank line of said plurality of lines located sequentially downward from an upper edge of a respective divided overlapping partial image and said lower blank line a first blank line of said plurality of lines located sequentially upward from a lower edge of said respective divided overlapping partial image.

8. The copy apparatus of claim 7 which is portable for use as a hand-held copier.

9. A copying apparatus comprising:
    image reading means for reading an image of a portion of a document and generating dot images corresponding to said image having been read;
    memory means for storing dot images obtained by said image reading means;
    image division means for dividing said stored dot images into overlapping partial images so as to partially overlap with an adjacent partial image in a direction of print;
    image extraction means for extracting only a central portion to be printed out with respect to each of said divided overlapping partial images by detecting a respective pair of blank lines between which said central portion is defined; and
    print means for printing out said central portions of said divided overlapping partial images,
    each of said divided overlapping partial images has an upper edge and a lower edge and a plurality of lines located sequentially therebetween, and a central line, each of said detected respective pairs of blank lines comprising an upper blank line and a lower blank line, said upper blank line a first blank line of said plurality of lines located sequentially upward from a respective center line of a respective divided overlapping partial image and said lower blank line a first blank line of said plurality of lines located sequentially downward from said respective center line.

10. The copying apparatus of claim 9 which is portable for use as a hand-held copier.

* * * * *